(12) United States Patent
Park et al.

(10) Patent No.: US 6,769,003 B2
(45) Date of Patent: Jul. 27, 2004

(54) PARALLEL LOGGING METHOD FOR TRANSACTION PROCESSING SYSTEM

(75) Inventors: Nam Shik Park, Taejon (KR); Han Namgoong, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 401 days.

(21) Appl. No.: 10/057,938

(22) Filed: Jan. 29, 2002

(65) Prior Publication Data

US 2002/0178177 A1 Nov. 28, 2002

(51) Int. Cl.[7] .............................................. G06F 17/30
(52) U.S. Cl. ...................................................... 707/202
(58) Field of Search ................................ 707/202, 204, 707/200

(56) References Cited

U.S. PATENT DOCUMENTS 5,544,359 A * 8/1996 Tada et al. .................. 707/202
6,341,285 B1 * 1/2002 Blott et al. ..................... 707/8
6,519,614 B1 * 2/2003 Kanai et al. ................. 707/202
6,691,115 B2 * 2/2004 Mosher et al. ................ 707/10
6,728,879 B1 * 4/2004 Atkinson ..................... 713/168

* cited by examiner

Primary Examiner—Jack Choules
(74) Attorney, Agent, or Firm—Jacobson Holman PLLC

(57) ABSTRACT

A parallel logging method for a transaction processing system for simultaneously executing transactions of a plurality of application programs is disclosed. According to the method, a transaction control section instructs transaction participants to execute a transaction preparing step and a transaction commit step in accordance with transaction end requests of the application programs that have executed transaction operations. A log queue manager receives a log write request for status information of the transactions requested from the transaction control sections. Then, a plurality of log managers simultaneously execute the log write of the corresponding transactions in parallel in accordance with a request of the log queue manager that has received the log write request. According to the method, the bottleneck phenomenon occurring during the log write of the transactions can be prevented and the time for the corresponding log write can be reduced to improve the whole performance of the transaction processing system.

11 Claims, 3 Drawing Sheets

PARALLEL LOGGING METHOD FOR TRANSACTION PROCESSING SYSTEM

BACKGROUND OF THE INVENTION

1. Field of the Invention

The present invention relates to a parallel logging method for a transaction processing system, and more particularly, to a parallel logging method for a transaction processing system that can simultaneously execute a parallel write of logs (i.e., status information) of application transactions using a plurality of log managers.

2. Background of the Related Art

The transaction log for writing status information of transactions executes writing of the transaction status information for transaction recovery in a storage device such as a disc. The input/output (I/O) work for storing such transaction status information requires a lot of time in comparison to an operational work of a computer processor, and this causes the whole performance of the transaction processing system to deteriorate. Also, in case of using one transaction log storage device, only a serial writing of logs is possible, and thus the whole performance of the transaction processing system is in dependence on the transaction log.

The existing transaction process including the above feature has been changed from a centralized type around a database server to a distributed processing type, i.e., client-server type. Recently, the transaction processing applications mainly follow a client-server model for the distributed transaction process. To support the above-described client-server model and to improve the performance of the transaction processing, a transaction processing monitor has been introduced and applied to general works.

The transaction processing monitor is a kind of system software for solving the problems such as a system down that may be produced due to a computer environment having a different operating system, a compatibility obstacle of application software, etc., under the client-server environment. The transaction processing monitor is well known as middleware.

Also, the conventional transaction processing system has its own single log storage device depending on the transaction processing system. This causes a bottleneck phenomenon during the writing of logs since the status information of the transactions are sequentially written in the single log storage device one by one during the transaction commit process.

As a prior art transaction processing system having the above-described feature, there is a Korean Patent No. 10-092811-0000 "Log/recovery management method for a transaction processing system" issued to Electronics and Telecommunications Research Institute in 1995. According to this prior art technique, the consistency of transaction data is guaranteed in a manner that a before image of a data block to be updated in the transaction is written in a log file, and the corresponding data block is recovered by the image before update when the transaction processing is canceled midway. However, the prior art transaction processing system has the disadvantages in that since it writes in serial the image before update of the data updated in the transaction in one log file, a bottleneck phenomenon may occur due to the writing that is executed using the before image.

Also, in case of the transaction processing system including the above-described feature, the before image of the data being updated is written in the log (i.e., file or disc) in order to guarantee the consistency of the transaction data as in the existing database management system. However, in case of the high-performance transaction processing system for processing the transactions using the transaction processing monitor, the corresponding transaction data is not directly managed as the data in the database, but only the status information of the transactions is written in the log by the transaction processing monitor to guarantee the consistency of the data when the data stored in various kinds of databases such as Informix, Oracle, etc., are updated in one transaction.

SUMMARY OF THE INVENTION

Accordingly, the present invention is directed to a parallel logging method for a transaction processing system that substantially obviates one or more problems due to limitations and disadvantages of the related art.

It is an object of the present invention to provide a parallel logging method for a transaction processing system that can prevent the bottleneck phenomenon occurring in plural log storage sections, and improve the performance of the whole system by reducing the time for writing the status of plural transactions. To achieve the object, plural log managers, which execute the corresponding log write in accordance with a log write request message received from a log queue manager, simultaneously execute the corresponding log write in parallel through the plural log storage sections.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a parallel logging method for a transaction processing system for processing transactions of application programs, the method comprising a first step of a transaction control section instructing transaction participants to execute a transaction preparing step and a transaction commit step in accordance with transaction end requests of the application programs that have executed transaction operations; a second step of a log queue manager receiving a log write request for status information of the transactions requested from the transaction control sections; and a third step of simultaneously executing the log write of the corresponding transactions in parallel through a plurality of log managers in accordance with a request of the log queue manager that has received the log write request.

In another aspect of the present invention, there is provided a transaction processing system for processing transactions of application programs, comprising a transaction manager for generating and managing a plurality of transactions in accordance with transaction processing requests of the application programs, a transaction control section for instructing transaction participants to execute transaction preparing and transaction commit steps requested from the transaction manager, a log queue manager for receiving and managing a log write request of status information of the transactions requested from the transaction control section, and a plurality of log managers for simultaneously executing the log write in parallel and providing resultant values of the parallel log write to the log queue manager in accordance with a log write request message transmitted from the log queue manager.

In still another aspect of the present invention, there is provided a recording medium for storing a program that is readable and executable by a computer and that can perform a parallel logging method for a transaction processing system for processing transactions of application programs, wherein a transaction control section instructs transaction participants to execute a transaction preparing step and a transaction commit step in accordance with transaction end requests of the application programs that have executed transaction operations, a log queue manager receives a log write request for status information of the transactions requested from the transaction control sections, and a plurality of log managers simultaneously execute a log write of the corresponding transactions in parallel in accordance with a request of the log queue manager that has received the log write request.

The transaction can give solutions to the conditions that may be produced due to unexpected problems (caused by a temperature, electromagnetic wave, humidity, overcurrent, unstable power supply, bad contact state of cables, and various kinds of complex causes) by integrally executing various kinds of related works. The transaction guarantees the data integrity, and improves the high-speed concurrency of the corresponding processed data.

That is, the transaction is a unit of work that guarantees the consistency of the transaction data by completely executing and terminating a work composed of various operations or by returning to its initial state before the work is executed.

Also, the transaction is executed through on-line in the same manner as a data transmission/reception through a communication line linked between a terminal device and a computer system, message exchange, inquiry-reply processing, etc., and is applied to a home shopping and a home banking that process a reserved order by a transaction service that is the representative service of an order entry as well as to a reserved order processing for hotels, theaters, trains, airplanes, etc.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENT

The parallel logging method for a transaction processing system according to the preferred embodiment of the present invention will now be explained in detail with reference to the accompanying drawings.

Figure 1:
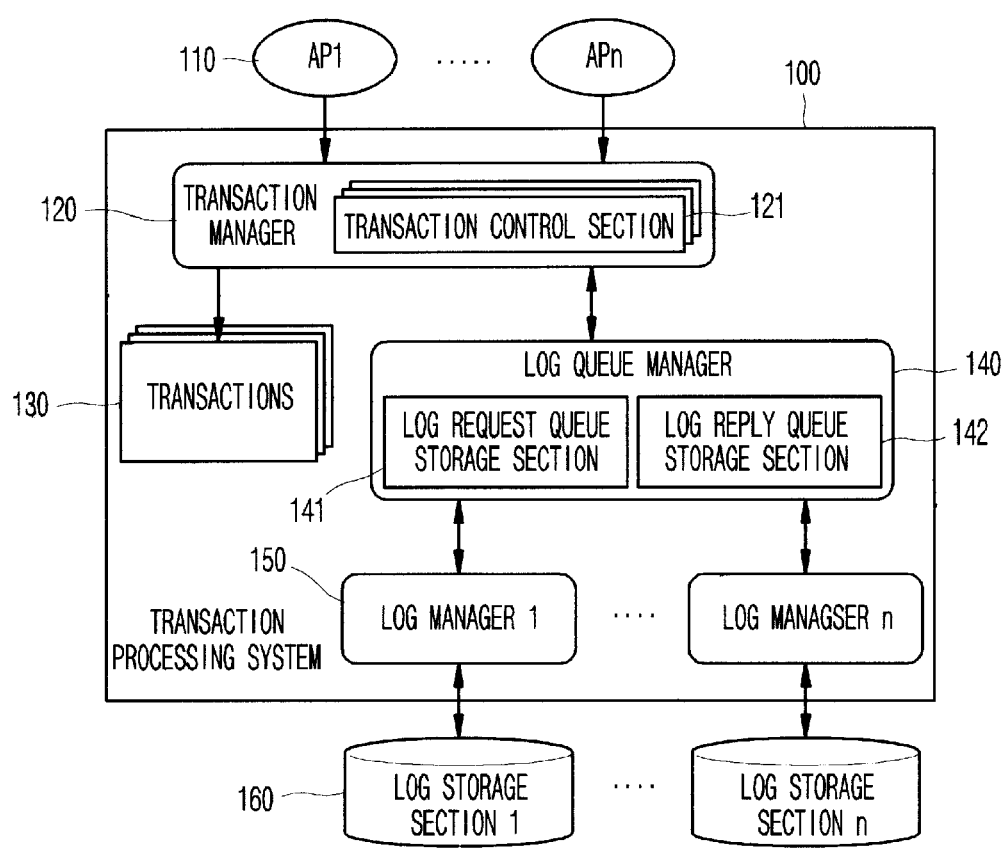
FIG. 1 is a constituent diagram of a transaction processing system for explaining a parallel logging method therefor according to the present invention.

FIG. 1 is a constituent diagram of the transaction processing system for explaining the parallel logging method therefor according to the present invention. Referring to FIG. 1, the transaction processing system 100 includes a transaction manager 120, a transaction control section 121, transactions 130, a log queue manager 140, a log request queue storage section 141, a log reply queue storage section 142, log managers 150, and log storage sections 160.

The transaction manager 120 generates and manages a plurality of transactions 130 according to transaction start requests of application programs 110. The transaction control section 121 instructs the transaction participants to execute works for the transaction processing, and receives and manages the corresponding result of the transaction processing from the transaction participants. The log queue manager 140 manages log request queues and log reply queues for log requests and replies. The log managers 150 simultaneously execute the corresponding log writes in parallel through their log storage sections 160.

The parallel logging method for the transaction processing system as constructed above will be explained.

First, the plurality of application programs (AP1, . . . , APn) 110 (for example, programs including the transaction processing such as a receipt, withdrawal, and automatic transfer of money in a bank) request the start of the corresponding transaction to the transaction manager 120 for the start of the corresponding transaction.

At this time, the transaction manager 120 provides an application programming interface (API) that can be called out by the application programs 110 to the corresponding application program. Accordingly, the corresponding application program 110 requests the start of the transaction by calling a begin( ) function provided by the transaction manager. The transaction manager 120 that has received this request generates a plurality of transactions 130 and then generates transaction identifiers to manage the status and information of the transaction. Thereafter, the transaction manager 120 allocates the transaction identifiers to the respective transactions 130, and inserts the transactions 130 in a transaction table managed by the transaction manager 120 to complete the transaction start step.

If the transaction start step as described above is completed, the application programs (AP1, . . . , APn) 110 execute the transaction operation (for example, the receipt, withdrawal, and automatic transfer of money in a bank such as credit( ), debit( ), etc.) as defined in the application programs, and then request the end of the transaction to the transaction manager 120. The transaction manager 120 that has received this request instructs the transaction control section 121 to execute two steps of a transaction commit protocol, i.e., a preparing step and a commit step.

The transaction control section 121, that has been instructed to execute the two-phase transaction commit protocol by the transaction manager 130, completes the two-phase transaction commit protocol in a manner that it instructs the transaction participants, for example, a database management system (DBMS) for supporting an XA interface of the X/Open distributed transaction processing (DTP) standard such as the Informix or Oracle that manages the transaction data, or resource managers, to execute the preparing step and the commit step in order. Then, the transaction control section 121 terminates the transaction processing of the application programs.

At this time, in case of instructing the transaction participants to execute the two-phase transaction commit protocol, for example, in case of transferring money from an Informix DBMS account to an Oracle DBMS account, the changed contents of the two DBMS accounts are stored in a disc to guarantee the consistency of the data. That is, at the preparing step, the transaction control section 121 calls a prepare( ) from the Informix and the Oracle to instruct them to prepare, and at the commit step, it calls a commit( ) from them to process the commit step so as to release locking information and resources used for processing the local transaction of the DBMS.

At this time, the log write of the status information of the transaction is executed at a two-phase transaction commit protocol completion time point when the transaction control section 121 receives the results of the two-phase transaction commit protocol process from all the transaction participants after the transaction control section 121 instructs the transaction participants to execute the preparing step and the commit step.

The log at the preparing step completion time, which is the log write of the status information of the corresponding transaction, is a LOG_COMMIT log (which is the title or type of a data structure written in the log storage section after completion of the preparing step, and is the transaction status and information wherein the preparing step has been completed). If the transaction control section 121 requests the log write to the log queue manager 140, the log queue manager 140 receives this request, and inserts the log write request message in the log request queue storage section 141. The log managers 150 receive the log write request message from the log queue manager 140, and execute the log write according to the received log write request message. Then, the log managers 150 provide resultant values of the log write to the log queue manager 140, and simultaneously request a reply to the log queue manager 140. The log queue manager 140, that has received the resultant values of the log write from the log managers 150, returns the resultant values to the transaction control section 121 to complete the preparing step of the two-phase transaction commit protocol.

If the LOG_COMMIT log of the preparing step is completed through the above-described process, the transaction control section 121 instructs the transaction participants to execute the commit step that is the last step of the two-phase transaction commit protocol, and then executes a LOG_DONE log (which is the title or type of a data structure written in the log storage section after completion of the commit step, and is the transaction status and information wherein the commit step has been completed) at the time point when the commit step is completed to complete the two-phase transaction commit protocol.

According to the LOG_DONE log at the time point when the commit step is completed, only the transaction status has been changed from COMMIT (which is one of the transaction status existing in the two-phase transaction commit protocol process, and represents the status where the preparing step is completed) to DONE (which is one of the transaction status existing in the two-phase transaction commit protocol process, and represents the status where the commit step is completed). Thus, the LOG_DONE log process is considered to be the same as the LOG_COMMIT log process executed at the time when the preparing step is completed, and thus the explanation thereof will be omitted.

Figure 2:
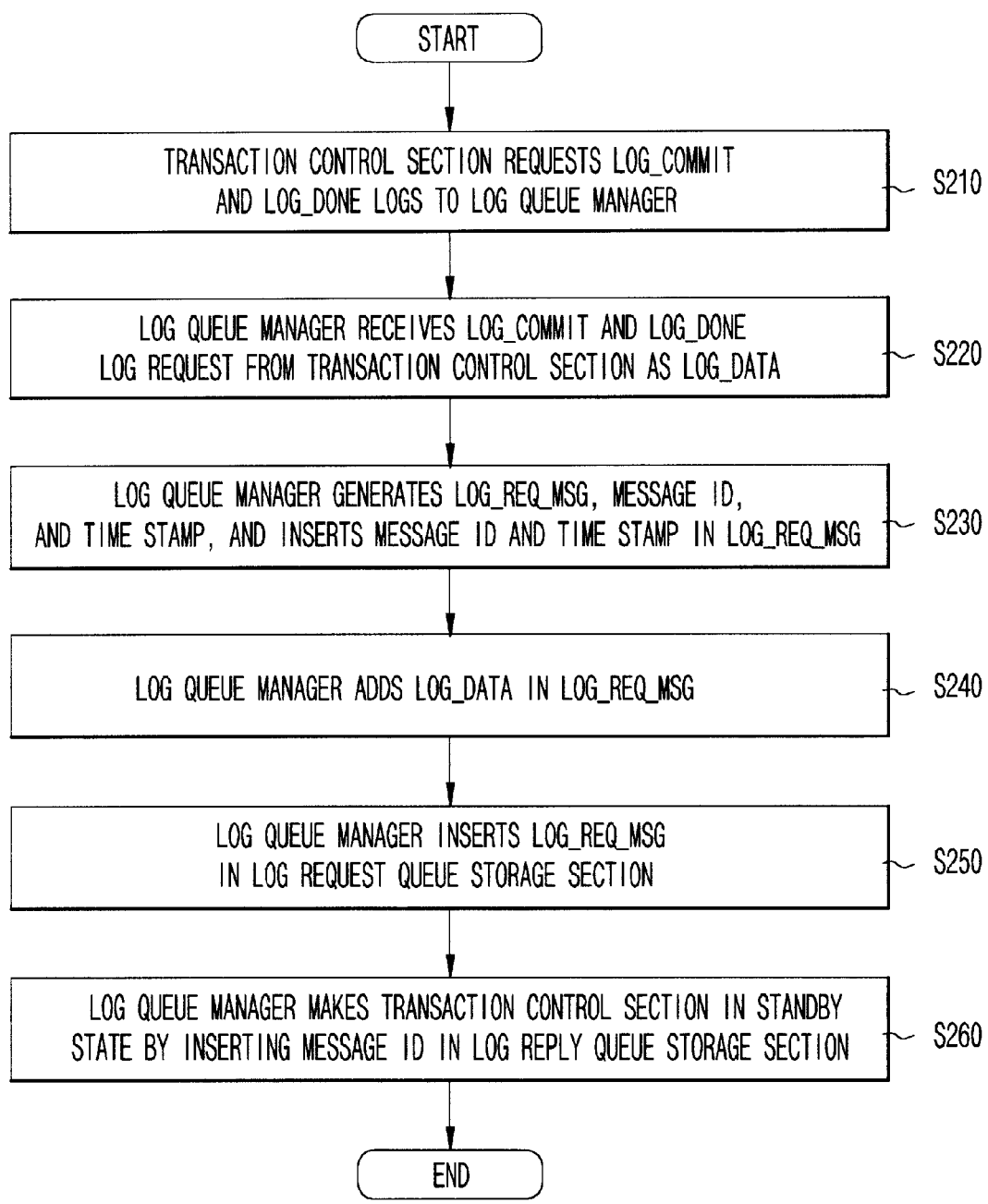
FIG. 2 is a flowchart illustrating the log write request receiving and processing procedure according to the parallel logging method for the transaction processing system according to the present invention.

FIG. 2 is a flowchart illustrating the operating process of the log queue manager that receives and processes the log write request from the transaction control section at the time when the preparing/commit step is completed.

First, if the transaction control section requests the log write such as the LOG_COMMIT or LOG_DONE to the log queue manager (step S210), the log queue manager receives it as LOG_DATA (i.e., the title or type of the data structure representing information that the log manager writes in the log) (step S220). Thereafter, the log queue manager generates a LOG_REQ_MSG (i.e., the title or type of the data structure representing a log request message including the LOG_DATA that is information to be written in the log by the log manager), message ID, and time stamp (i.e., the time value when the message is generated), inserts the message ID and the time stamp in the LOG_REQ_MSG (step S230), and then adds the LOG_DATA (step S240). Thereafter, the log queue manager inserts the LOG_REQ_MSG in the log request queue storage section LRQQ that is the log write request message storage (step S250), and then makes the transaction control section in a standby state at the corresponding message ID in the log reply queue storage section LRPQ (step S260).

That is, as a result of receipt of the log write request from the transaction control section, the LOG_REQ_MSG is inserted and exists in the log request queue storage section LRQQ by the log queue manager. The log managers execute the corresponding log write to process the LOG_REQ_MSG in the log request queue storage section LRQQ.

Figure 3:
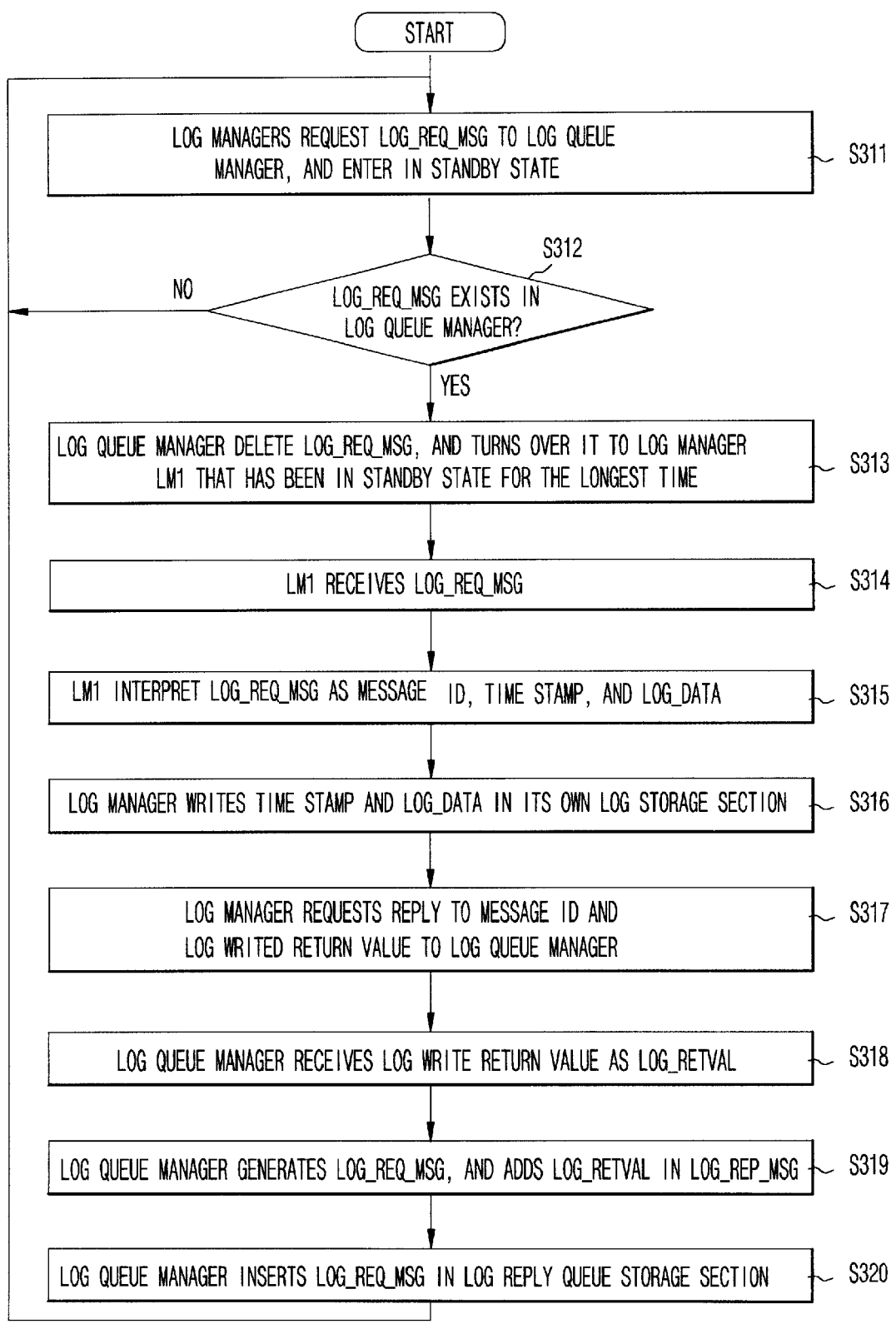
FIG. 3 is a flowchart illustrating the log write executing and replying procedure according to the parallel logging method for the transaction processing system according to the present invention.

FIG. 3 is a flowchart illustrating the log write process (i.e., the execution of the log request/write) executed by the log managers according to the parallel logging method for the transaction processing system according to the present invention.

First, the log managers LM1 to LMn request the LOG_REQ_MSG to the log queue manager, and are in a standby state to execute the corresponding log write (step S311).

The log queue manager, that received the request of LOG_REQ_MSG from the log managers, confirms whether the corresponding LOG_REQ_MSG exists in the log request queue storage section (step S312). If the LOG_REQ_MSG exists in the log request queue storage section as a result of confirmation, the log queue manager delete the LOG_REQ_MSG from the log request queue storage section, and turns over the deleted LOG_REQ_MSG to the log manager that has been in the standby state for the longest time, for example, the log manager LM1 (step S313).

The log manager LM1 that has been in the standby state for the longest time receives the LOG_REQ_MSG from the log queue manager (step S314), and interprets the received LOG_REQ_MSG as the message ID, time stamp, and LOG_DATA (step S315). Thereafter, the log manager LM1 writes the interpreted time stamp and LOG_DATA in its own log storage section (step S316). The log manager transmits the message ID and a LOG_OK to the log queue manager in case that the corresponding log write is successful, while a LOG_ERR in case that the log write is unsuccessful, as log write return value. The log queue manager, that is requested to reply (step S317), receives the LOG_OK (i.e., a code representing a constant value that means the normal state of the executed log write) or LOG_ERR (i.e., a code representing a constant value that means the error state of the executed log write) received from the log manager as a LOG_RETVAL (i.e., the resultant state of executing the log write, i.e., return value of either LOG_OK or LOG_ERR) (step S318).

The log queue manager, that has received the LOG_RETVAL, generates a LOG_REP_MSG (i.e., the title or type of the data structure representing the message when the log manager replies to the log queue manager with the result after executing the log write), and then adds the LOG_RETVAL to the generated LOG_REP_MSG (step S319). Thereafter, the log queue manager inserts the LOG_REP_MSG in the log reply queue storage section, and thus the log manager LM1 that has been in the standby state for the longest time completes the log write (step S 320). Thereafter, the log manager requests the LOG_REQ_MSG to the log queue manager to process the next log write request, and enters into the standby state.

As described above, with respect to the transaction end request from the application programs, the transaction control section completes the LOG_COMMIT log and the LOG_DONE log at the time when the transaction preparing/commit step is completed as shown in FIGS. 2 and 3. That is, the transaction control section completes the transaction end request of the application programs by completing the two-phase transaction commit protocol and returning the results to the transaction manager.

From the foregoing, it will be apparent that the present invention has the advantages in that it can improve the whole performance of the transaction processing system and prevent the bottleneck phenomenon occurring during the log write of the transactions by simultaneously executing the parallel log write of the corresponding transactions when the log queue manager and the plurality of log managers which execute the log write in their own log storage devices execute the two-phase transaction commit protocol.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A parallel logging method for a transaction processing system for processing transactions of application programs, the method comprising:
   a first step of a transaction control section instructing transaction participants to execute a transaction preparing step and a transaction commit step in accordance with transaction end requests of the application programs that have executed transaction operations;
   a second step of a log queue manager receiving a log write request for status information of the transactions requested from the transaction control sections; and
   a third step of simultaneously executing the log write of the corresponding transactions in parallel through a plurality of log managers in accordance with a request of the log queue manager that has received the log write request.

2. The parallel logging method as claimed in claim 1, wherein the second step comprises the steps of:
   receiving the log write request message from the transaction control section as a log data (LOG_DATA);
   generating a log request message (LOG_REQ_MSG) including the received log write request message, and inserting the generated LOG_REQ_MSG in a message storage means; and
   the plurality of log managers executing the log write in accordance with the inserted LOG_REQ_MSG.

3. The parallel logging method as claimed in claim 2, wherein the log write is executed by the log manager that has been in a standby state for the longest time.

4. The parallel logging method as claimed in claim 2, wherein the LOG_REQ_MSG includes a message ID generated by the log queue manager, a time stamp, and the LOG_DATA.

5. The parallel logging method as claimed in claim 1, wherein the plurality of log managers provide a resultant value of the log write execution to the log queue manager.

6. The parallel logging method as claimed in claim 1, wherein the plurality of log managers transmit a log error message (LOG_ERR) to the log queue manager if the log write is unsuccessful, while transmit a log OK message (LOG_OK) to the log queue manager if the log write is successful.

7. A transaction processing system for processing transactions of application programs, comprising:
   a transaction manager for generating and managing a plurality of transactions in accordance with transaction processing requests of the application programs;
   a transaction control section for instructing transaction participants to execute transaction preparing and transaction commit steps requested from the transaction manager;
   a log queue manager for receiving and managing a log write of status information of the transactions requested from the transaction control section; and
   a plurality of log managers for simultaneously executing the log write in parallel and providing resultant values of the log write to the log queue manager in accordance with a log write execution request message received from the log queue manager.

8. The transaction processing system as claimed in claim 7, wherein the log queue manager comprises:
   a log request queue storage section for storing the log write request message received from the transaction control section; and
   a log reply queue storage section for storing a reply message for providing a processing result according to the log write request to the transaction control section.

9. The transaction processing system as claimed in claim 7, wherein the plurality of log managers comprises a plurality of log storage sections for storing and managing related information on the log write.

10. The transaction processing system as claimed in claim 7, wherein the transaction participant includes a database management system (DBMS).

11. A recording medium for storing a program that is readable and executable by a computer and that can perform a parallel logging method for a transaction processing system for processing transactions of application programs, wherein a transaction control section instructs transaction participants to execute a transaction preparing step and a transaction commit step in accordance with transaction end requests of the application programs that have executed transaction operations, a log queue manager receives a log write request for status information of the transactions requested from the transaction control sections, and a plurality of log managers simultaneously execute a log write of the corresponding transactions in parallel in accordance with a request of the log queue manager that has received the log write request.

* * * * *

UNITED STATES PATENT AND TRADEMARK OFFICE
CERTIFICATE OF CORRECTION

PATENT NO. : 6,769,003 B2
DATED : July 27, 2004
INVENTOR(S) : Nam Shik Park et al.

It is certified that error appears in the above-identified patent and that said Letters Patent is hereby corrected as shown below:

<u>Title page,</u>
Item [30], should read:
-- [30] Foreign Priority Data: May 28, 2001 (KR) ............2001-2939 --
should be included after "item (22)".

Signed and Sealed this

Twenty-second Day of February, 2005

JON W. DUDAS
*Director of the United States Patent and Trademark Office*